(12) United States Patent
Liu

(10) Patent No.: US 10,871,870 B2
(45) Date of Patent: Dec. 22, 2020

(54) INFORMATION PROCESSING METHOD AND DEVICE FOR DISPLAYING SERVICE COMPLETION STATUS

(71) Applicant: Advanced New Technologies Co., Ltd., George Town (KY)

(72) Inventor: Lindong Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 15/999,081

(22) Filed: Aug. 17, 2018

(65) Prior Publication Data

US 2019/0018548 A1 Jan. 17, 2019

Related U.S. Application Data

(63) Continuation of application No. PCT/CN2017/072882, filed on Feb. 4, 2017.

(30) Foreign Application Priority Data

Feb. 17, 2016 (CN) .......................... 2016 1 0090068

(51) Int. Cl.
*G06F 3/0481* (2013.01)
*G06Q 50/10* (2012.01)
(Continued)

(52) U.S. Cl.
CPC .......... *G06F 3/0481* (2013.01); *G06F 3/0482* (2013.01); *G06F 3/04842* (2013.01);
(Continued)

(58) Field of Classification Search
CPC .... G06Q 50/2053; G06Q 50/10; G06Q 10/10; H04L 67/327; G06F 3/048; G06F 3/14
See application file for complete search history.

(56) References Cited

U.S. PATENT DOCUMENTS 7,103,835 B1 * 9/2006 Yankovich ............ G06F 40/174
715/234
7,111,232 B1 * 9/2006 Bascom ................ G06F 16/958
715/209
(Continued)

FOREIGN PATENT DOCUMENTS

CN 103218707 7/2013
CN 104063149 9/2014
(Continued)

OTHER PUBLICATIONS

International Search Report issued by the International Searching Authority in International Application No. PCT/CN2017/072882 dated Jun. 2, 2017; 9 pages.
(Continued)

*Primary Examiner* — Jennifer N To
*Assistant Examiner* — Qi Wan
(74) *Attorney, Agent, or Firm* — Fish & Richardson P.C.

(57) ABSTRACT

A first number representing a number of total items in an interface is determined. The interface is a user interface displayed by a display device. A second number representing a number of completed items in the interface is determined. The first number and the second number are displayed, by the display device, in the interface. A status of a button in the interface is determined based on the first number and the second number. Attribute information of the button is obtained. A value of the attribute information is changed based on the second number and a predetermined rule. Changing the value of the attribute information can cause a change in the displayed appearance of the button.

16 Claims, 11 Drawing Sheets

(51) Int. Cl.
    *G06Q 10/00*     (2012.01)
    *G06F 3/14*     (2006.01)
    *G06F 3/0482*     (2013.01)
    *G06F 3/0484*     (2013.01)

(52) U.S. Cl.
    CPC ............ *G06F 3/04847* (2013.01); *G06F 3/14* (2013.01); *G06Q 10/00* (2013.01); *G06Q 50/10* (2013.01)

(56) References Cited

U.S. PATENT DOCUMENTS

| | | | | |
|---|---|---|---|---|
| 2005/0102631 A1* | 5/2005 | Andreas | ................. | G06F 9/451 715/772 |
| 2005/0240756 A1* | 10/2005 | Mayer | ................. | G06F 9/4418 713/2 |
| 2007/0277122 A1 | 11/2007 | Frijlink et al. | | |
| 2008/0040259 A1* | 2/2008 | Snow | ................. | G06Q 40/02 705/38 |
| 2008/0215976 A1* | 9/2008 | Bierner | ................. | G06F 17/243 715/708 |
| 2012/0124457 A1 | 5/2012 | Yuniardi | | |
| 2013/0159884 A1* | 6/2013 | Isozu | ................. | H04W 4/023 715/753 |
| 2013/0325489 A1 | 12/2013 | Abrahams et al. | | |
| 2013/0325503 A1* | 12/2013 | Abrahams | ............. | G06Q 50/22 705/3 |
| 2014/0201707 A1* | 7/2014 | Schroeder | ............. | G06F 8/30 717/106 |
| 2014/0278361 A1* | 9/2014 | Pak | ................. | G06F 17/2276 704/9 |
| 2014/0298153 A1* | 10/2014 | Tsujimoto | ............ | G02B 21/365 715/232 |
| 2014/0344004 A1* | 11/2014 | Surendran | ........ | G06Q 10/06316 705/7.26 |
| 2015/0019356 A1* | 1/2015 | Bagdonas | .......... | G06Q 30/0238 705/21 |
| 2015/0079555 A1* | 3/2015 | Alexander | ............... | G09B 7/04 434/169 |
| 2015/0106211 A1* | 4/2015 | Khalil | .................... | G06Q 30/02 705/14.72 |
| 2015/0109243 A1* | 4/2015 | Jun | ........................ | G06F 3/044 345/174 |
| 2016/0277536 A1* | 9/2016 | Barry | .................... | H04L 67/327 |

FOREIGN PATENT DOCUMENTS

| | | |
|---|---|---|
| CN | 105045464 | 11/2015 |
| TW | I393897 | 4/2013 |
| TW | I515637 | 1/2016 |
| WO | WO 2008067316 | 6/2008 |

OTHER PUBLICATIONS

European Extended Search Report in European Patent Application No. 17752649.8, dated Oct. 14, 2019, 9 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

\* cited by examiner

Register an account

User name: Mumu1234

Password: ******************

Email address: mu*****2008@163.com

Mobile number:

(3/4) Submit

FIG. 2

Register an account

User name: 1234567

Password: ******************

Email address: mu*****2008@163.com

Mobile number: 139****975

(4/4) Submit

FIG. 5a

Register an account

User name: 1234567   Please enter another one.

The user name is an 8-bit symbol that consists of letters, special symbols, and digits and must include an uppercase letter, a lowercase letter, and a digit.

Password: ******************

Email address: mu*****2008@163.com

Mobile number: 139****975   Please enter another one.

The mobile number contains 11 digits (2/4) Submit

FIG. 5b

Register an account

User name: Mumu1234

Password: ******************

Email address: mu*****2008@163.com

Mobile number: 139****9752

(4/4) Submit

FIG. 6

INFORMATION PROCESSING METHOD AND DEVICE FOR DISPLAYING SERVICE COMPLETION STATUS

This application is a continuation of PCT Application No. PCT/CN2017/072882, filed on Feb. 4, 2017, which claims priority to Chinese Patent Application No. 201610090068.2, filed on Feb. 17, 2016, and each application is hereby incorporated by reference in its entirety.

TECHNICAL FIELD

The present application relates to the field of network data processing technologies, and in particular, to an information processing method and device for displaying a service completion status.

BACKGROUND

With the rapid development of Internet technologies, many enterprises, banks, and government agencies provide services for users through online platforms. As such, these platforms can improve personal service processing efficiency and reduce service processing costs. To ensure the security of the online platforms and the traceability for the users' service status, the users usually need to provide personal registration information when they apply for website accounts. When a user registers an account with a website, the website usually provides a personal information registration form on a web page for the user and requests the user to fill in corresponding registration information. The information registration form usually includes a primary button, and the user uses the primary button to submit the information registration form to the website. In the existing technology, the primary button is disabled when the user is filling in the information registration form and can be activated after the user has finished filling in the information registration form.

In the existing technology for form submissions, the primary button is usually disabled and can be activated after the user has finished filling in the form. The previously described information interaction displaying method can cause the user to be confused with the current filling progress of the registration form, especially when the registration form includes a large number of fields. Therefore, such a simple information interaction displaying method based on the disabled primary button hinders the user experience.

SUMMARY

Implementations of the present application provide an information processing method and device for displaying a current service completion status to a user and improving the user experience.

The information processing method and device for displaying a service completion status provided in the implementations of the present application are implemented as follows:

An information processing method for displaying a service completion status is provided, and the method includes the following: determining the total number of service items based on the number of first-type service items in a service operation interface; detecting the number of second-type service items in the service operation interface that are completed by a user to determine the number of completed service items; displaying a counting unit showing the total number of service items and the number of completed service items at a predetermined position in the service operation interface; and determining an operation status of a designated operation button in the service operation interface based on service item completion information currently displayed by the counting unit.

An information processing device for displaying a service completion status is provided, and the device includes the following: a unit for determining the total number of service items, configured to determine the total number of service items based on the number of first-type service items in a service operation interface; a unit for determining the number of completed service items, configured to detect the number of second-type service items in the service operation interface that are completed by a user to determine the number of completed service items; a count displaying unit, configured to count and display the total number of service items and the number of completed service items at a predetermined position in the service operation interface; and an operation status setting unit, configured to determine an operation status of a designated operation button in the service operation interface based on service item completion information currently displayed by the counting unit.

According to the information processing method and device for displaying a service completion status described in the present application, the current service item completion progress information can be displayed to the user, and the operation status of the designated operation button can be set based on the service completion information. The user can see the number of completed service items and the total number of mandatory service items. As such, the user experience is improved. In addition, one or more of the following attribute information of the designated operation button in the page form can change with information input progress of the user: transparency, hue, brightness, purity, size, shape, etc. As such, the user can be more aware of the current service item completion progress, and the user experience can be further improved.

BRIEF DESCRIPTION OF DRAWINGS

To describe the technical solutions in the implementations of the present application, the following briefly describes the accompanying drawings for describing the implementations. Apparently, the accompanying drawings in the following description merely show some implementations of the present application, and a person of ordinary skill in the art can still derive other drawings based on these accompanying drawings without creative efforts.

FIG. 2 is a schematic diagram illustrating a counting unit arranged on a submit button, according to an implementation of the present application.

FIG. 5a is a status diagram illustrating a service operation interface when a predetermined service completion progress requirement is satisfied, according to the present application.

FIG. 5b is a status diagram illustrating a service operation interface when an operation requirement is not satisfied after verification, according to the present application.

FIG. 6 is a schematic diagram illustrating an application scenario of verifying data modified by a user, according to the present application.

DESCRIPTION OF EMBODIMENTS

To make a person skilled in the art better understand the technical solutions in the present application, the following describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Figure 1:
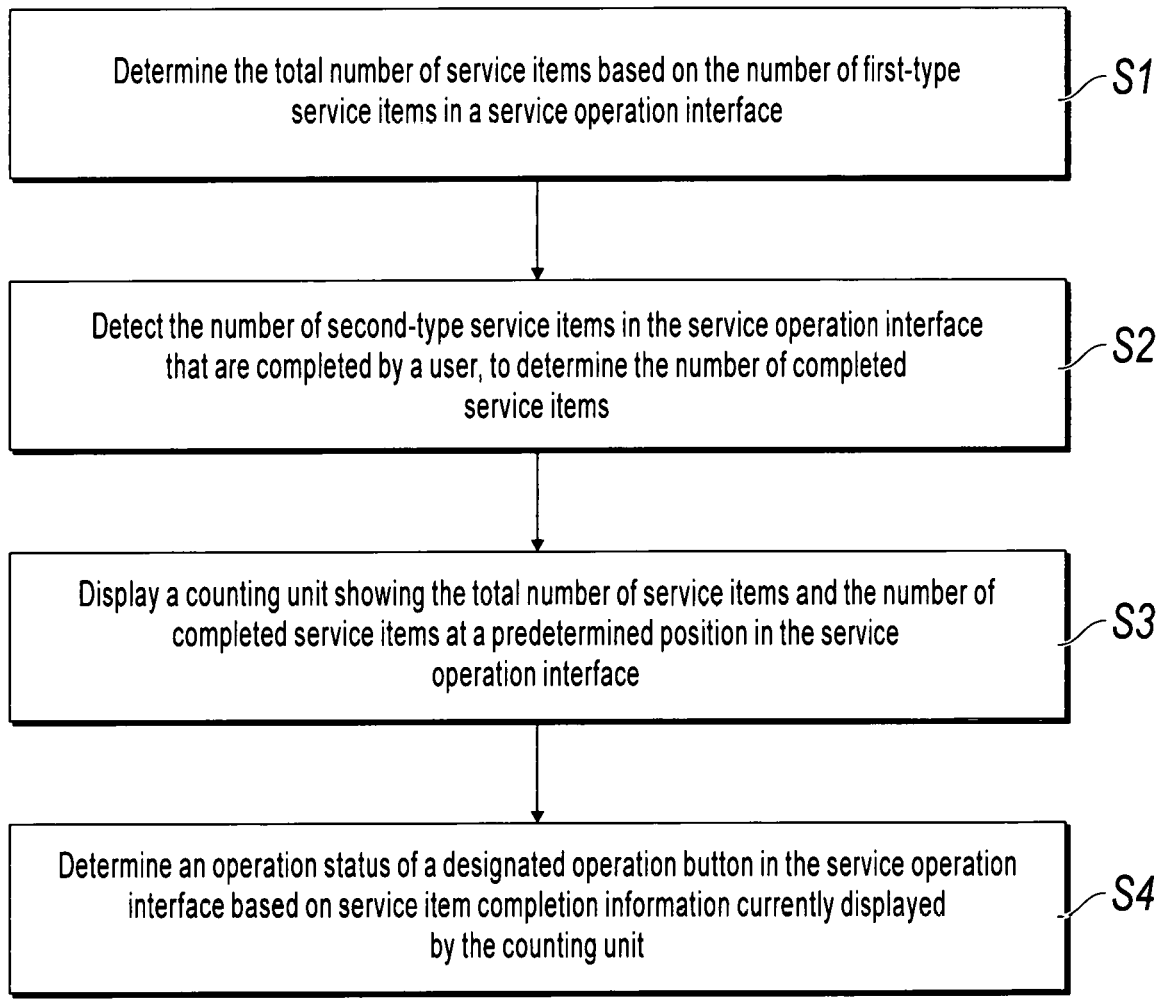
FIG. 1 is a flowchart illustrating an information processing method for displaying a service completion status, according to an implementation of the present application.

An information processing method for displaying a service completion status in the present application is described below in detail with reference to the accompanying drawings. FIG. 1 is a flowchart illustrating an information processing method for displaying a service completion status, according to an implementation of the present application. Although the present application provides method operation steps described in the following implementations or the accompanying drawings, the method can include more operation steps or fewer operation steps based on conventional or non-creative efforts. In steps without necessary logical causes, the execution sequence of these steps is not limited to the execution sequence provided in the present implementation of the present application. The method can be performed in an actual memory distribution process or on an actual device based on the sequence illustrated in the present implementation, the accompanying drawing, or in parallel (for example, in a parallel processor or multi-threaded processing environment).

FIG. 1 shows an implementation of an information processing method for displaying a service completion status provided in the present application. The method can include the following steps:

S1. Determine the total number of service items based on the number of first-type service items in a service operation interface.

In the present implementation, the service operation interface can be a website page form including a plurality of first-type service items, for example, a website's user information registration page, an examination application information registration page, a user feedback investigation reporting page, or a user account appeal information submission page. The service operation interface usually includes the first-type service items such as a username, a password, an email address, a mobile number, and an address. The first-type service items can be displayed in the service operation interface as input fields. A user can enter data in the input fields. The data can be one or more of the following types: text, digits, letters, symbols, etc.

Current completion progress of the user can be obtained by determining the total number of first-type service items and the number of second-type service items in the service operation interface that are completed by the user. In actual application scenarios, the service operation interface can include mandatory service items and optional service items. In an implementation of the present application, mandatory items among the first-type service items can be defined as the second-type service items. For example, on the website's user information registration page, a username, a password, an email address, and a mobile number can be set as mandatory service items. The mandatory service items are service items that the user needs to complete. The optional service items are service items that the user can complete or not complete. For example, the mobile number and the address in the first-type service items are optional service items. Certainly, the second-type service items can also be set based on actual application scenario needs. For example, in other implementations of the present application, the second-type service items can be the same as the first-type service items on the user information registration page.

In an implementation of the present application, the first-type service items can be all service items in the service operation interface. In other words, the total number of service items is the total number of the mandatory service items and the optional service items. In another implementation of the present application, the first-type service items can be the mandatory service items in the service operation interface. In other words, the total number of service items is the number of mandatory service items. For example, in an application scenario, a website's user information registration page includes 12 service items, such as eight mandatory service items and four optional service items. In the first implementation, the total number of service items can be set to 12. In the second implementation, the total number of service items can be set to 8.

S2. Detect the number of second-type service items in the service operation interface that are completed by a user to determine the number of completed service items.

In the present implementation, the second-type service items can include service items completed by the user, and the second-type service items are included in the first-type service items. In an implementation of the present application, the second-type service items can be all the service items in the service operation interface. In other words, the number of completed service items is the total number of mandatory service items completed by the user and optional service items. In another implementation of the present application, the second-type service items can be the mandatory service items among all the service items. In other words, the total number of completed service items is the number of mandatory service items completed by the user.

In the present implementation, a counter can be arranged on a client or a back-end server corresponding to the service operation interface. The counter is used to count the number of second-type service items that are completed by the user. The maximum count of the counter can be set to the total number of service items. In the present implementation, the count in the counter can be increased each time the user completes one second-type service item in the service operation interface. Whether the user completes the second-type service item can be determined by detecting a cursor movement in an input field of the second-type service item. When the cursor leaves the input field of the current second-type service item, it can be determined that the user completes the second-type service item. In this case, the count in the counter can be increased by 1. In an implementation of the present application, the cursor leaving the input field of the current second-type service item can mean that the cursor moves to an input field of a next second-type service item. For example, the cursor moves from a username input field to a password input field. In another implementation of the present application, the cursor leaving the current predetermined input field can mean that the user clicks an operation button corresponding to the input field of the current second-type service item. Clicking the operation button can mean that the user completes the second-type service item.

In an application scenario of the present application, a website's user information registration page includes four first-type service items, an initial value of the counter is set to 0, and the total count of the counter is set to 4. When the user completes a second service item by entering the username, the count is increased by 1, and the number of completed service items is 1. When the user completely enters data for the four second-type service items, the number of completed service items is 4.

S3. Display a counting unit showing the total number of service items and the number of completed service items at a predetermined position in the service operation interface.

In the present implementation, the number of completed service items obtained by the counter and the total number of service items can be displayed at the predetermined position in the service operation interface as the counting unit. The counting unit can include any one of the following: a text description, a digit, a percentage, a progress bar, etc. For example, the text description "12 of 14" or "12 entered, 2 to be entered", or the digit "12/14" can be displayed. The counting unit can be displayed at the predetermined position in the service operation interface. The counting unit can be displayed at the bottom or the right middle position of the service operation interface. Alternatively, the counting unit can be displayed in the service operation interface as a floating window as the service operation interface scrolls or displays in the right middle position of the screen.

In the present implementation, the counting unit showing the total number of service items and the number of completed service items can be arranged on a designated operation button in the service operation interface. The designated operation button can be a button for submitting, saving, changing, or canceling the service operation. FIG. 2 is a schematic diagram illustrating a counting unit arranged on a submit button, according to an implementation of the present application. As shown in FIG. 2, the user has entered data for three second-type service items on the website's user information registration page. In this case, the digit "3/4" is set on the submit button to remind the user that the user has entered the data for the three second-type service items, and there is still one second-type service item with no data entered.

In another implementation of the present application, the method can further include obtaining at least one of the following attribute information of the designated operation button: transparency, hue, brightness, purity, size, and shape; and changing a value of the attribute information based on the number of completed service items and a predetermined attribute value changing rule.

At least one of the following attribute information can be set for the designated operation button in the service operation interface: transparency, hue, brightness, and purity. A value of the transparency, hue, brightness, or purity can be changed based on the number of completed service items and the predetermined changing rule. The submit button can reflect the light transmittance of the designated operation button. For example, the transparency of the submit button can be set to 75% when the user has entered data for one of the four first-type service items, to 50% when the user has entered data for two service items, to 25% when the user has entered data for three service items, and to 100% when the user has entered data for the four service items. The hue can be used to distinguish colors. The colors can be red, yellow, green, and purple based on different wavelengths of light. For example, the hue of the submit button is set to red when the user has entered data for one of the four first-type service items, to yellow when the user has entered data for two service items, to green when the user has entered data for three service items, and to purple when the user has entered data for the four service items. The brightness can reflect color brightness. For example, the color changing from black to gray and then to white is a color brightness change. The purity is proportions of colored components contained in the color.

Figure 3:
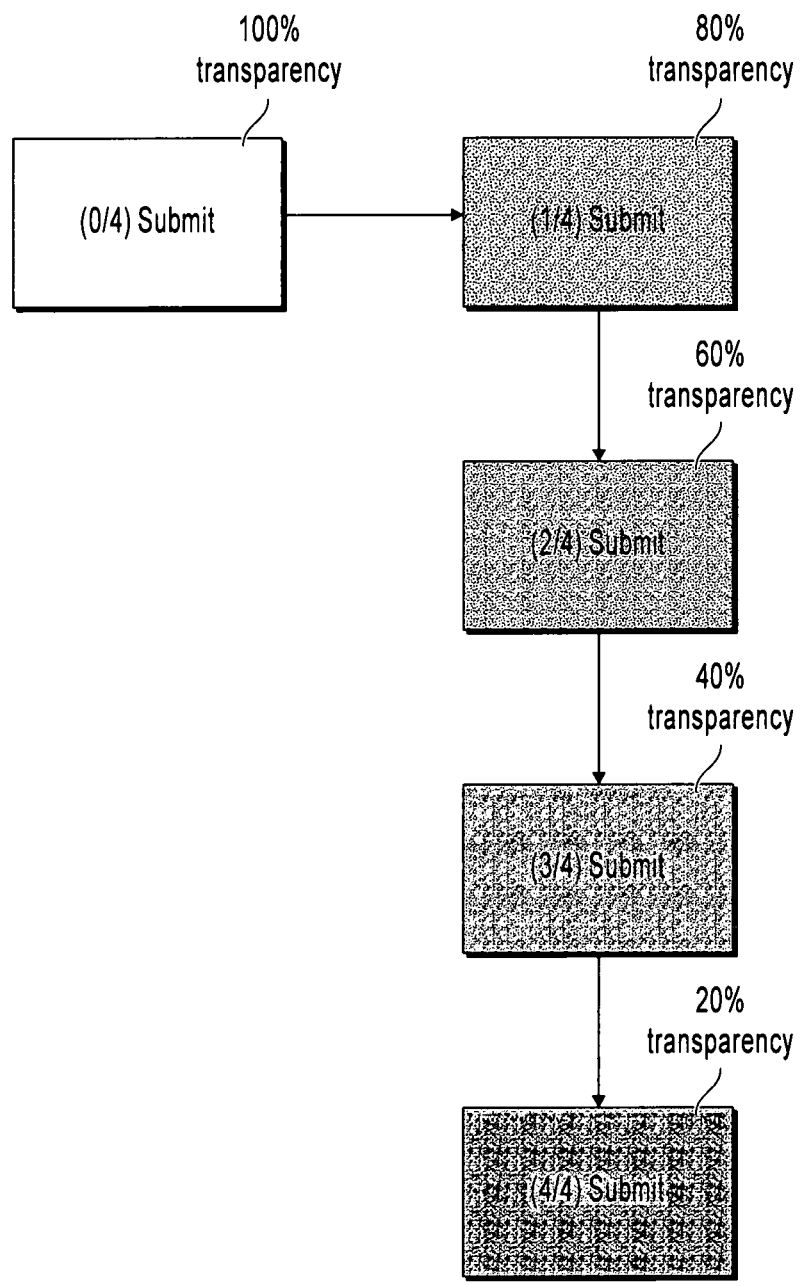
FIG. 3 is a schematic diagram illustrating transparency of a submit button changing with input information submission progress, according to the present application.

When the attribute information is transparency, transparency of the designated operation button can change from a first transparency value to a second transparency value as the number of completed service items in the counting unit changes from the minimum value to the maximum value. FIG. 3 is a schematic diagram illustrating submit button transparency changing with input information submission progress, according to the present application. As shown in FIG. 3, transparency of the submit button is 100% when no second-type service item is completed, and 80%, 60%, 40%, and 20% when the user completes one, two, three, and four second-type service items, respectively.

S4. Determine an operation status of a designated operation button in the service operation interface based on service item completion information currently displayed by the counting unit.

In the present implementation, the operation status of the designated operation button can be determined based on the service item completion information currently displayed by the counting unit. Based on service item completion information currently displayed by the counting unit, determining an operation status of a designated operation button in the service operation interface can include: activating the designated operation button in the service operation interface when the number of completed service items in the counting unit satisfies a predetermined service completion progress requirement.

The predetermined service completion progress requirement can be that the number of service items completed by the user is not less than a predetermined minimum threshold of completed service items, or that the user completes the mandatory service items among all the service items. Based on different methods for setting the first-type service items and the second-type service items, determining an operation status of a designated operation button in the service operation interface based on service item completion information currently displayed by the counting unit can include the following cases:

The first-type service items are all service items in the service operation interface, and the second-type service items are also all the service items in the service operation interface. Correspondingly, the determining an operation status of a designated operation button in the service operation interface based on service item completion information currently displayed by the counting unit includes: activating the designated operation button in the service operation interface when the number of completed service items in the counting unit is greater than or equal to the predetermined minimum threshold of completed service items. For example, the website's user information registration page includes 12 service items. The first-type service items can be all the 12 service items, and the second-type service items can also be all the 12 service items. The predetermined minimum threshold for completed service items is 8. The submit button in the website's user information registration page can be activated when the user completes eight second-type service items.

The first type service items are all the service items in the service operation interface, and the second-type service items are mandatory service items among all the service items. Correspondingly, the designated operation button in the service operation interface is activated when the number of completed service items in the service operation interface reaches the total number of mandatory service items. For example, the 12 service items on the website's user information registration page include nine mandatory service items. The first-type service items are all the 12 service items, and the second-type service items are the nine mandatory service items. The submit button on the website's user information registration page can be activated when nine second-type service items are completed.

The first-type service items are mandatory service items among all the service items, and the second-type service items are also the mandatory service items among all the service items. Correspondingly, the designated operation button in the service operation interface is activated when the number of completed service items in the service operation interface reaches the total number of mandatory service items. For example, on the website's user information registration page, the first-type service items are the nine mandatory service items, and the second-type service items are also the nine mandatory service items. The submit button on the website's user information registration page can be activated when all nine mandatory service items are completed.

Figure 4:
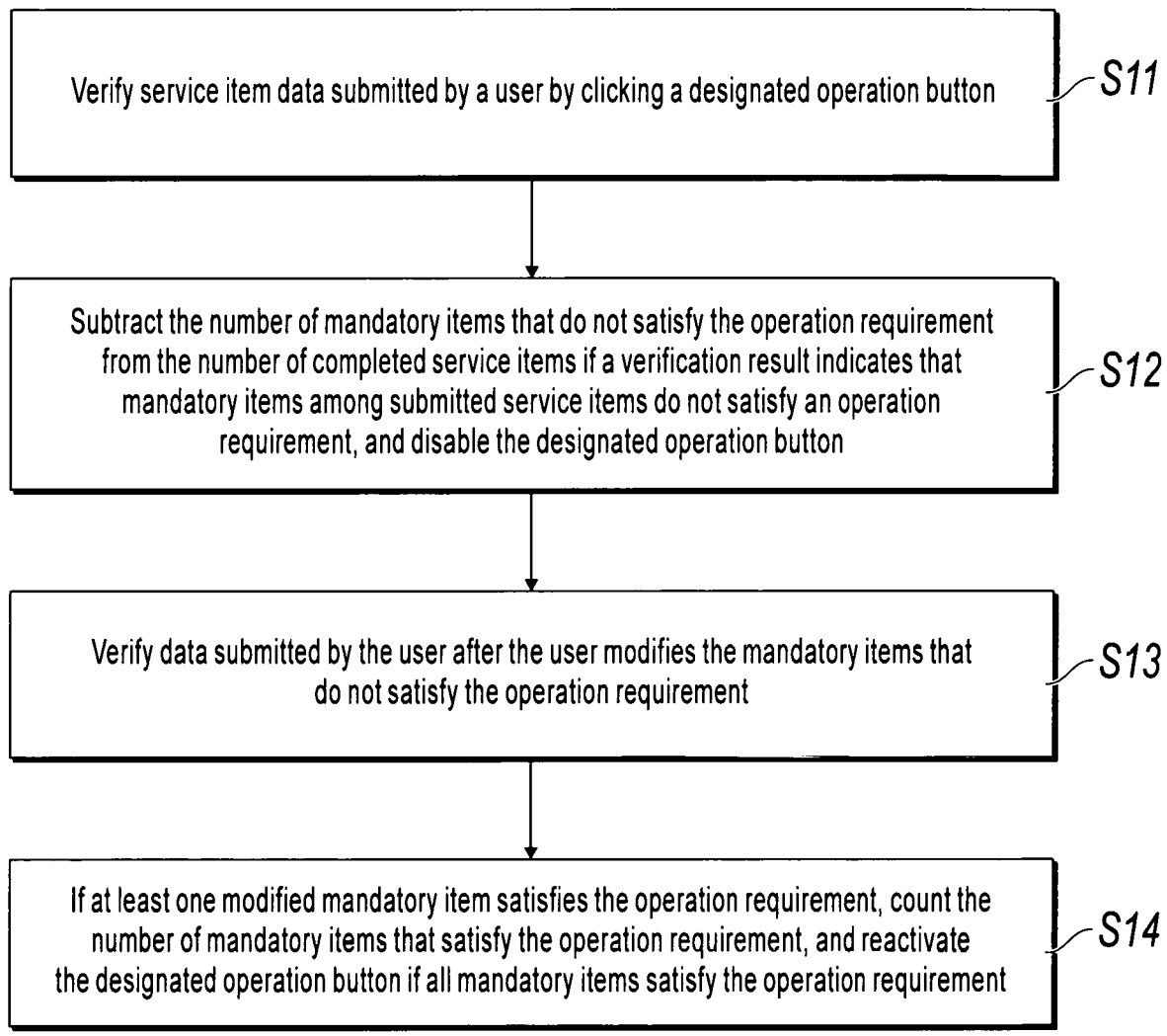
FIG. 4 is a flowchart illustrating a method for verifying data submitted by a user, according to an implementation of the present application.

In another implementation of the present application, the service items submitted by the user can be verified. FIG. 4 is a flowchart illustrating a method for verifying data submitted by a user, according to an implementation of the present application. As shown in FIG. 4, the method can further include the following steps:

S11. Verify service item data submitted by the user by clicking the designated operation button.

The designated operation button is activated when the number of completed service items satisfies the predetermined service completion progress requirement. The user can click the designated operation button to submit completed service items. In the present implementation, the service items submitted by the user can be verified. During data verification, the service item data submitted by the user can be compared with predetermined rules corresponding to the service items. The predetermined rules can be set out of consideration of security, convenience for storage, etc. For example, a predetermined rule for entering the username can be an 8-bit symbol that consists of letters, special symbols, and digits, and must include an uppercase letter, a lowercase letter, and a digit.

S12. Subtract the number of mandatory items that do not satisfy the operation requirement from the number of completed service items in the counting unit if a verification result indicates that mandatory items among submitted service items do not satisfy an operation requirement, and disable the designated operation button.

If the verification result indicates that mandatory items among the submitted service items do not satisfy the operation requirement, the number of mandatory items that do not satisfy the operation requirement can be subtracted from the number of completed service items in the counting unit, and the designated operation button can be disabled. In an implementation of the present application, FIG. 5a is a status diagram illustrating a service operation interface when a predetermined service completion progress requirement is satisfied, according to the present application. In this case, the submit button is activated. After the user clicks the submit button, information submitted by the user is verified. After the verification, it is detected that the username and the mobile number do not satisfy the operation requirement. FIG. 5b is a status diagram illustrating a service operation interface when an operation requirement is not satisfied after verification, according to the present application. As shown in FIG. 5b, 2 is subtracted from the number of completed service items in the counting unit, and the submit button is disabled.

It is worthwhile to note that, if the verification result indicates that the mandatory items in the submitted service items do not satisfy the operation requirement, prompt information can be further set in the input fields of the corresponding service items or in predetermined ranges of the input fields of the service items. The prompt information is used to display the operation requirement corresponding to the service items, and remind the user to enter data satisfying the operation requirement. For example, as shown in FIG. 5b, a predetermined username input rule is displayed below the username input field, and prompt information of "Please enter another one" is displayed on the right of the username input field.

After the user modifies the mandatory items that do not satisfy the operation requirement, data submitted by the user continues to be verified. The method further includes the following steps:

S13. Verify data submitted by the user after the user modifies the mandatory items that do not satisfy the operation requirement.

S14. If a verification result indicates that at least one modified mandatory item satisfies the operation requirement, count the number of mandatory items that satisfy the operation requirement, and set the number of completed service items in the counting unit to the number of mandatory items that satisfy the operation requirement.

In addition, the designated operation button is reactivated when all mandatory items satisfy the operation requirement.

FIG. 6 is a schematic diagram illustrating an application scenario of verifying data modified by a user, according to the present application. As shown in FIG. 6, after the user modifies the data for the mandatory items that do not satisfy the operation requirement, it is verified that the modified data satisfies the operation requirement. In this case, the submit button is reactivated.

According to the information processing method for displaying a service completion status described in the present application, current service item completion progress information can be displayed to the user, and the operation status of the designated operation button can be set based on the service completion information. The user can clearly see the number of completed service items and the total number of mandatory service items. As such, the user experience is improved. In addition, one or more of the following attribute information of the designated operation button in the page form changes with information input progress of the user: transparency, hue, brightness, purity, size, shape, etc. As such, the user can be more aware of the current service item completion progress, and the user experience can be further improved.

Figure 7:
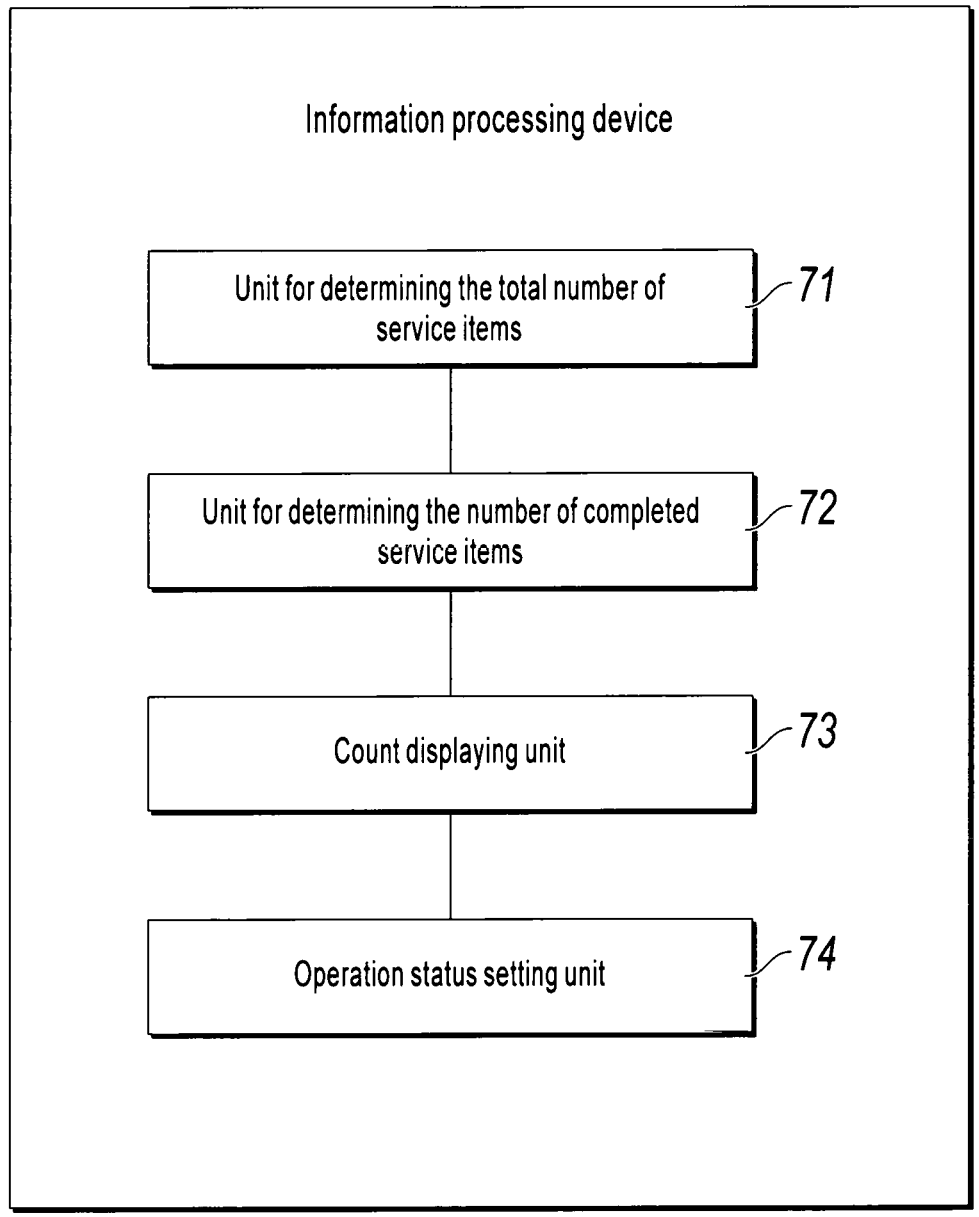
FIG. 7 is a schematic structural diagram illustrating an information processing device for displaying a service completion status, according to an implementation of the present application.

Another aspect of the present application further provides an information processing device for displaying a service completion status. FIG. 7 is a schematic diagram illustrating a module structure of an information processing device for a displaying service completion status, according to an implementation of the present application. As shown in FIG. 7, the device can include the following: a unit 71 for determining the total number of service items, configured to determine the total number of service items based on the number of first-type service items in a service operation interface; a unit 72 for determining the number of completed service items, configured to detect the number of second-type service items in the service operation interface that are completed by a user to determine the number of completed service items; a count displaying unit 73, configured to count and display the total number of service items and the number of completed service items at a predetermined position in the service operation interface; and an operation status setting unit 74, configured to determine an operation status of a designated operation button in the service operation interface based on service item completion information currently displayed by the counting unit.

In an implementation of the present application, the operation status setting unit 74 determines an operation status of a designated operation button in the service operation interface, based on service item completion information currently displayed by the counting unit, includes activating, by an active state setting unit, the designated operation button in the service operation interface when the number of completed service items in the unit for determining the number of completed service items satisfies a predetermined service completion progress requirement.

In another implementation of the present application, the displaying unit 73 can include a button arrangement unit, configured to arrange the counting unit showing the total number of service items and the number of completed service items on a designated operation button in the service operation interface.

Arranging the counting unit on the designated operation button can not only associate the completion progress with the designated operation button, but also improve the user experience.

Figure 8:
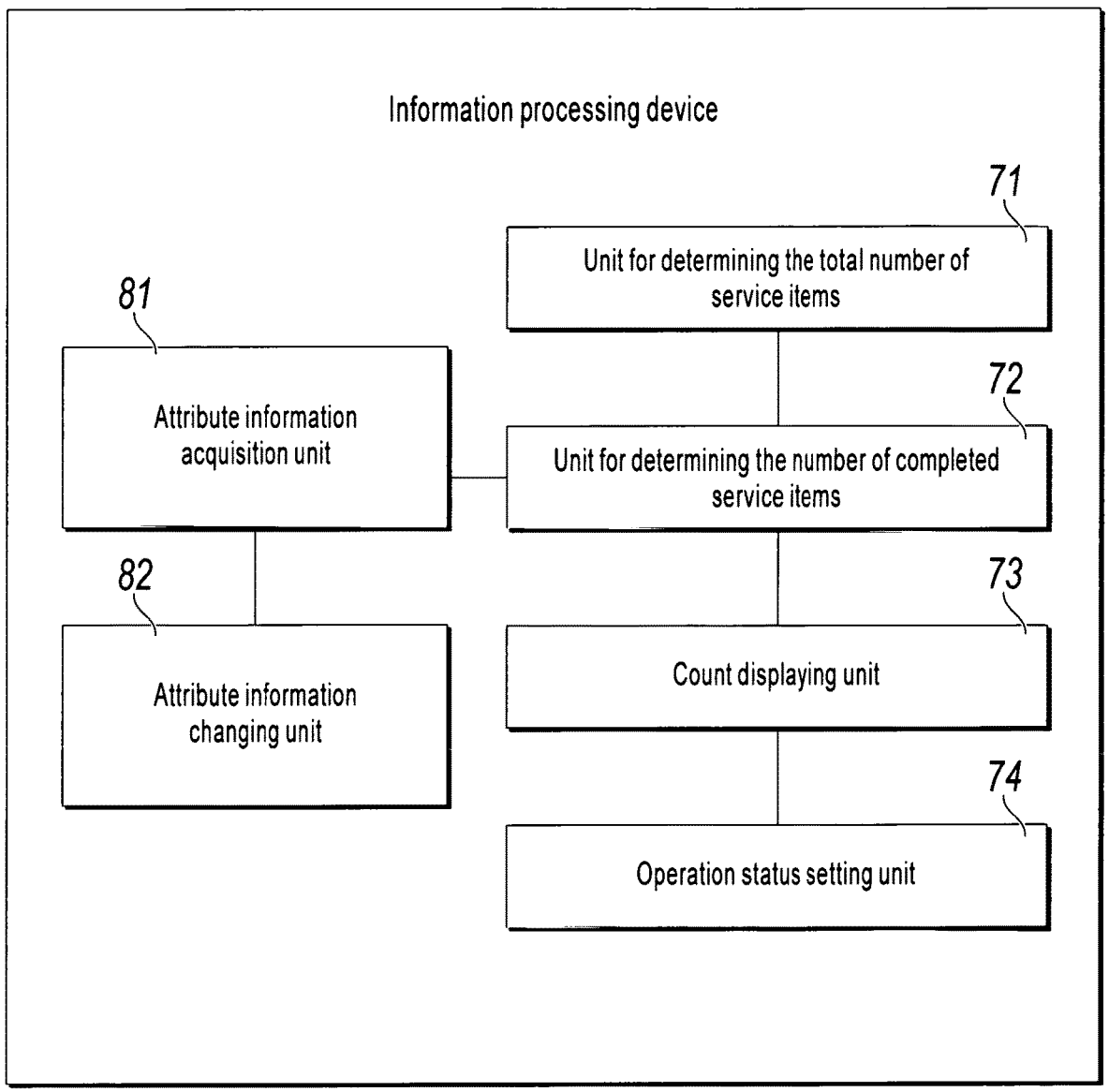
FIG. 8 is a schematic structural diagram illustrating an information processing device for displaying a service completion status, according to another implementation of the present application.

FIG. 8 is a schematic diagram illustrating a module structure of an information processing device for displaying a service completion status, according to another implementation of the present application. As shown in FIG. 8, the device can further include an attribute information acquisition unit 81, configured to obtain at least one of the following attribute information of the designated operation button: transparency, hue, brightness, purity, size, and shape; and an attribute value changing unit 82, configured to change a value of the attribute information based on the number of completed service items and a predetermined attribute value changing rule.

In an implementation of the present application, the attribute information is transparency. Correspondingly, the attribute value changing unit changes a value of the attribute information, based on the number of completed service items and a predetermined attribute value changing rule, includes changing, by the attribute value changing unit, transparency of the designated operation button from a first transparency value to a second transparency value as the number of completed service items in the counting unit changes from the minimum value to the maximum value.

In another implementation of the present application, the first-type service items and the second-type service items can be set by using any one of the following methods: The first-type service items are all service items in the service operation interface, and the second-type service items are also all the service items in the service operation interface. Correspondingly, the operation status setting unit 74 is configured to activate the designated operation button in the service operation interface when the number of completed service items in the counting unit is greater than or equal to a predetermined minimum threshold of completed service items. The first-type service items are all the service items in the service operation interface, and the second-type service items are mandatory service items among all the service items. Correspondingly, the operation status setting unit 74 is configured to activate the designated operation button in the service operation interface when the number of completed service items in the service operation interface reaches the total number of mandatory service items. Moreover, the first-type service items are mandatory service items among all the service items, and the second-type service items are also the mandatory service items among all the service items. Correspondingly, the operation status setting unit 74 is configured to activate the designated operation button in the service operation interface when the number of completed service items in the service operation interface reaches the total number of mandatory service items.

Figure 9:
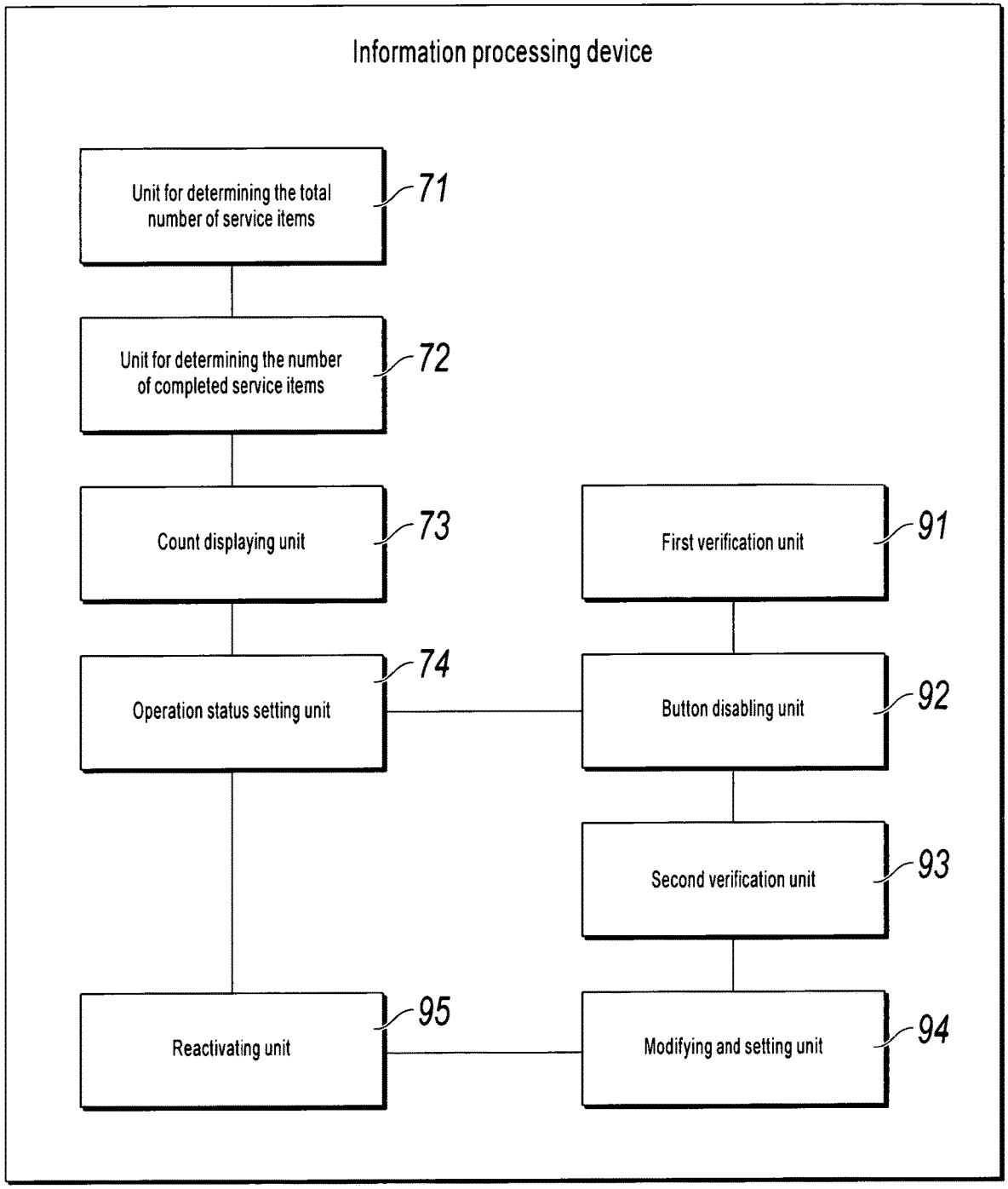
FIG. 9 is a schematic structural diagram illustrating an information processing device for displaying a service completion status, according to another implementation of the present application.

FIG. 9 is a schematic diagram illustrating a module structure of an information processing device for displaying a service completion status, according to another implementation of the present application. As shown in FIG. 9, the device can further include the following: a first verification unit 91 configured to verify service item data submitted by the user by clicking the designated operation button. A button disabling unit 92 configured to subtract the number of mandatory items that do not satisfy the operation requirement from the number of completed service items in the counting unit if a verification result indicates that mandatory items among submitted service items do not satisfy an operation requirement, and disable the designated operation button. A second verification unit 93 configured to verify data submitted by the user after the user modifies the mandatory items that do not satisfy the operation requirement. A modifying and setting unit 94 configured to count the number of mandatory items that satisfy the operation requirement if a verification result obtained by the second verification unit 93 indicates that at least one modified mandatory item satisfies the operation requirement, and set the number of completed service items in the counting unit to the number of mandatory items that satisfy the operation requirement. Moreover, a reactivating unit 95 configured to reactivate the designated operation button when all mandatory items satisfy the operation requirement.

According to the information processing device for displaying a service completion status described in the present application, the current service item completion progress information can be displayed to the user, and the operation status of the designated operation button can be set based on the service completion information. The user can clearly see the number of completed service items and the total number of mandatory service items. As such, the user experience is improved. In addition, one or more of the following attribute information of the designated operation button in the page form changes with information input progress of the user: transparency, hue, brightness, purity, size, shape, etc. As such, the user can be more aware of the current service item completion progress, and the user experience can be further improved.

Although the content of the present application includes descriptions of data displaying, setting, and processing, such as page information displaying, operation button (such as a submit button) status setting, and data verification, the present application is not necessarily limited to cases that fully conform to industry programming language design standards or data displaying and processing described in the implementations. Some implementations obtained after the page design language or implementation descriptions are slightly modified can achieve the same, equivalent, similar, or predictable effect as the previously described implementations. Certainly, even if the previously described data processing and determining method is not used, the same application can still be implemented provided that the statistics collection, information interaction, and information determining and feedback methods in the previously described implementations of the present application are conformed to. Details are omitted here.

Although the present application provides method operation steps described in the implementations or flowcharts, more operation steps or fewer operation steps can be included based on conventional or non-creative means. The sequence of the steps listed in the implementations is merely one of numerous step execution sequences, and does not represent the unique execution sequence. For an actual device or client product, the steps can be executed based on the sequence illustrated in the implementations or accompanying drawings or executed in parallel (for example, in a parallel processor or multi-threaded processing environment).

The units and device illustrated in the previously described implementations can be implemented by a computer chip or an entity, or can be implemented by a product with a certain function. For ease of description, the previously described device is described by dividing the functions into various modules. Certainly, the functions of the modules can be implemented in one or more pieces of software and/or hardware during implementation of the present application. For example, the first verification unit and the second verification unit described in the previously described implementations can be implemented by the same verification device or function module. Certainly, a module implementing the same function as a certain unit module described in the present application can also be implemented by a plurality of submodules or a combination of submodules.

A person skilled in the art also knows that, in addition to implementing a controller by using only computer readable program code, logic programming can be performed on method steps to allow the controller to implement the same function in the form of a logic gate, a switch, an application-specific integrated circuit (ASIC), a programmable logic controller, an embedded microcontroller, etc. Therefore, such a controller can be considered as a hardware component. Devices that are included in the controller and used to implement various functions can be considered as structures in the hardware component. Alternatively, the devices used to implement various functions can even be considered as software modules implementing the method and structures in the hardware component.

The present application can be described in the general context of computer executable instructions executed by a computer, for example, a program module. Commonly, the program module includes a routine, a program, an object, a component, a data structure, a class, etc. that execute a particular task or implement a particular abstract data type. The present application can also be practiced in distributed computing environments. In the distributed computing environments, tasks are performed by remote processing devices that are connected through a communications network. In a distributed computing environment, the program module can be located in local and remote computer storage media including storage devices.

It can be seen from descriptions of the implementations that, a person skilled in the art can clearly understand that the present application can be implemented by using software in addition to a necessary universal hardware platform. Based on such an understanding, the technical solutions of the present application essentially or the part contributing to the existing technology can be implemented in a form of a software product. The software product can be stored in a storage medium, such as a read-only memory (ROM)/random access memory (RAM), a magnetic disk, or an optical disc, and includes several instructions for instructing a computer device (which can be a personal computer, a mobile terminal, a server, a network device, etc.) to perform the methods described in the implementations or in some parts of the implementations of the present application.

The implementations in the present specification are described in a progressive manner. For the same or similar parts in the implementations, reference can be made to each other. Each implementation focuses on a difference from other implementations. The present application can be used in many general-purpose or dedicated computer system environments or configurations, for example, personal computers, server computers, handheld or portable devices, tablet-type devices, multiprocessor systems, microprocessor-based systems, set-top boxes, programmable electronic devices, network PCs, minicomputers, mainframe computers, distributed computing environments including any one of the previously described systems or devices, etc.

Although the present application is described by using implementations, a person of ordinary skill in the art knows that many modifications and variations of the present application can be made without departing from the spirit of the present application. It is expected that the claims include these modifications and variations without departing from the spirit of the present application.

Figure 10:
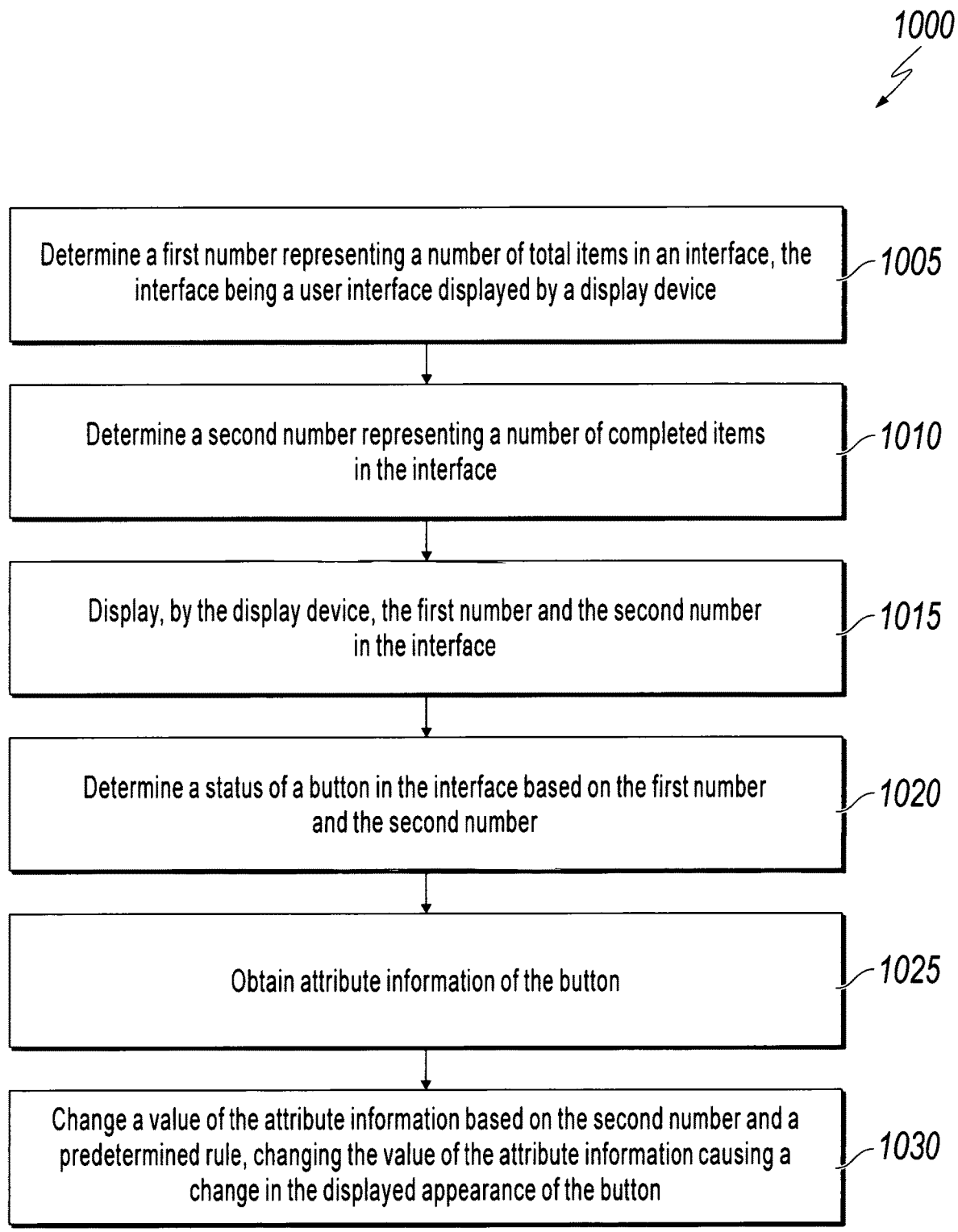
FIG. 10 is a flowchart illustrating an example of a computer-implemented method for displaying a service completion status with a submission button, according to an implementation of the present disclosure.

FIG. 10 is a flowchart illustrating an example of a computer-implemented method 1000 for displaying a service completion status with a submission button, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1005, a first number representing a number of total items in an interface is determined. The interface can be a user interface displayed by a display device. In some implementations, the first number of total items is determined based on a third number representing a number of first-type items in the interface. The interface can be a service operation interface, such as a website page form including multiple first-type items. For example, the interface can be a website user information registration page, an examination application information registration page, a user feedback investigation reporting page, or a user account appeal information submission page. The interface can include the first-type items (such as, username, password, email address, mobile number, and address). In some implementations, the first-type items can be displayed in the interface as input fields. A user can enter data (such as, text, digits, letters, and symbols) in the input fields.

In some implementations, the first-type items can be all items in the interface that include mandatory items and optional items. In this case, the first number of total items can be the total number of the mandatory items and the optional items in the interface. The mandatory items can be items that the user needs to complete. The optional items can be items that the user can complete and does not need to complete. For example, on a website user information registration page, username, password, email address, and mobile number can be set as mandatory items. Address can be set as optional items. In some implementations, the first-type items can be mandatory items in the interface. In this case, the first number of total items can be the total number of the mandatory items in the interface. From 1005, method 1000 proceeds to 1010.

At 1010, a second number representing a number of completed items in the interface is determined. In some implementations, the second number of completed items is determined based on a fourth number representing a number of second-type items in the interface that are completed by a user. The second-type items can be included in the first-type items. For example, if the second-type items are all items in the interface, the second number of completed items can be the total number of mandatory items and optional items completed by the user. If the second-type items are the mandatory items among all the items in the interface, the second number of completed items can be the number of mandatory items completed by the user. From 1010, method 1000 proceeds to 1015.

At 1015, the first number and the second number are automatically displayed, by the display device, in the interface. In some implementations, a counter showing the first number and the second number can be displayed at a predetermined position in the interface. The counter can be displayed as a text description, a digit, a percentage, and a progress bar. For example, the displayed text description can be "12 of 14" (that is, the first number is 14 and the second number is 12) or "12 entered, 2 to be entered". The displayed digit can be "12/14". In some cases, the counter can be displayed at the bottom or the right middle position of the interface. In some cases, the counter can be displayed in the interface as a floating window. As the interface scrolls in a screen, the counter can be displayed in the right middle position of the screen.

In some implementations, the first number and the second number can be arranged on a designated operation button in the interface. The designated operation button can be a button for submitting, saving, changing, or canceling a service operation. From 1015, method 1000 proceeds to 1020.

At 1020, a status of a button in the interface is automatically determined based on the first number and the second number. In some implementations, the button is a submission button. The first number and the second number can be displayed on the submission button in the interface. In some implementations, determining the status of the button in the interface comprises automatically activating the button in the interface when the second number of completed items satisfies a predetermined condition. If both the first-type and second-type items are all items in the interface, the button in the interface can be activated when the second number of completed items is greater than or equal to a predetermined minimum threshold of completed items. For example, if a website user information registration page includes 12 items and both the first-type and second-type items are the all 12 items, the predetermined minimum threshold of completed items can be set to 8. When a user completes eight second-type items in the interface, the button in the website user information registration page can be automatically activated. If the first-type items are all items or mandatory items in the interface, and the second-type items are mandatory items, the button in the interface can be activated when the second number of completed items reaches the total number of mandatory items. From 1020, method 1000 proceeds to 1025.

At 1025, attribute information of the button is obtained. The attribute information of the button can include at least one of transparency, hue, brightness, purity, size, and shape of the button. From 1025, method 1000 proceeds to 1030.

At 1030, a value of the attribute information is changed based on the second number and a predetermined rule. Changing the value of the attribute information can cause a change in the displayed appearance of the button. For example, if the attribute information of the button includes the transparency of the button, the transparency of the button can change from a first transparency value to a second transparency value when the second number of completed items changes from a first value to a second value. The first value can be a minimum value and the second value can be a maximum value. For example, if a website user information registration page includes 4 items and both the first-type and second-type items are the all 4 items, the transparency of the button can change from 100% transparency to 20% transparency when the second number of completed items changes from 0 (that is, the minimum value) to 4 (that is, the maximum value) (shown in FIG. 3).

In some implementations, data submitted by a user can be verified. The data can include the completed items and is submitted when the user clicks the button. If mandatory items in the submitted data do not satisfy a predetermined condition, the number of mandatory items that do not satisfy the predetermined condition can be subtracted from the second number of completed items. The predetermined condition can be set based on, for example, security, convenience for storage, or a combination of both. For example, a predetermined condition for an entered username can be an 8-bit symbol that consists of letters, special symbols, and digits, and must include an uppercase letter, a lowercase letter, and a digit. In addition, the button can be disabled in the interface.

In some implementations, the user can modify the mandatory items that do not satisfy the predetermined condition and submit the modified data. The modified data is submitted when the user clicks the button. After the modified data is submitted, the modified data can be verified. If at least one modified mandatory item satisfies the predetermined condition, the number of mandatory items that satisfy the predetermined condition can be counted. The second number of completed items can be set to the number of mandatory items that satisfy the predetermined condition. When all mandatory items satisfy the predetermined condition, the button can be reactivated. After 1030, method 1000 stops.

A primary button (such as, a submission button) is used by a user to submit, for example, an information registration form. Normally, the primary button displayed in an interface is disabled when the user is filling in the information registration form, and can be activated after the user has finished filling in the information registration form. Simply disabling the primary button may cause the user to be confused with the current filling progress of the registration form, especially when the registration form includes a large number of fields. The subject matter described in this specification can be used to provide a current filling progress when a user is filling a form for submission. For example, in addition to disabling the primary button, a current filling completion status can be displayed on or near the primary button. In addition, one or more of transparency, hue, brightness, purity, size, and shape of the primary button can be changed with the current filling progress. As a result, the user can know the current filling progress of the form, thereby improving user experience when filling the form for submission.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    displaying, by a display device, a form in a user interface with a number of items for a user to complete in the user interface;
    determining a first number representing a total of the number of items;
    receiving user input completing at least one of the number of items in the user interface;
    in response to the received user input, determining a second number representing a number of completed items in the user interface;
    displaying, in the user interface, both the first number and the second number on a button, wherein the displayed first number and the displayed second number are non-negative integers, the displayed first number is a fixed number, the displayed second number changes based on how many items of the number of items has been completed in the user interface, the button is disabled while the user is filling the form, and the button is enabled after the user has finished filling in the form with the displayed second number equal to the displayed first number;
    obtaining an attribute information of the button, wherein the attribute information of the button corresponds to a display appearance of the button including at least one of transparency, hue, brightness, purity, size, and shape of the button;
    changing a value of the attribute information based on the second number and a predetermined rule, wherein changing the value of the attribute information causes a change in the displayed appearance of the button;
    when the button is enabled, in response to a user clicking input on the button, submitting the completed number of items displayed in the user interface for data verification;
    in response to determining that one or more mandatory items of the completed number of items displayed in the user interface do not satisfy one or more operation requirements associated with the one or more mandatory items:
        updating the displayed second number by subtracting the number of mandatory items that do not satisfy the one or more operation requirements from the displayed second number; and
        after updating the displayed second number, disabling the button in the user interface.

2. The computer-implemented method of claim 1, wherein displaying the first number and the second number in the user interface comprises displaying a counter showing the first number and the second number at a predetermined position in the user interface, and the button is a submission button.

3. The computer-implemented method of claim 1, wherein the first number is determined based on a third number representing a number of first-type items in the user interface, and the second number is determined based on a fourth number representing a number of second-type items in the user interface that are completed by the user.

4. The computer-implemented method of claim 1, further comprising activating the button in the user interface when the second number satisfies a predetermined condition.

5. The computer-implemented method of claim 1, wherein the first number and the second number are displayed on the button in the user interface.

6. The computer-implemented method of claim 1, wherein the attribute information of the button includes the transparency of the button, and the transparency of the button changes from a first transparency value to a second transparency value when the second number changes from a minimum value to a maximum value.

7. A non-transitory, computer-readable medium storing one or more instructions executable by a computer system to perform operations comprising:
    displaying, by a display device, a form in a user interface with a number of items for a user to complete in the user interface;
    determining a first number representing a total of the number of items;
    receiving user input completing at least one of the number of items in the user interface;
    in response to the received user input, determining a second number representing a number of completed items in the user interface;
    displaying, in the user interface, both the first number and the second number on a button, wherein the displayed first number and the displayed second number are non-negative integers, the displayed first number is a fixed number, the displayed second number changes based on how many items of the number of items has been completed in the user interface, the button is disabled while the user is filling the form, and the button is enabled after the user has finished filling in the form with the displayed second number equal to the displayed first number;
    obtaining an attribute information of the button, wherein the attribute information of the button corresponds to a display appearance of the button including at least one of transparency, hue, brightness, purity, size, and shape of the button;
    changing a value of the attribute information based on the second number and a predetermined rule, wherein changing the value of the attribute information causes a change in the displayed appearance of the button;

when the button is enabled, in response to a user clicking input on the button, submitting the completed number of items displayed in the user interface for data verification;

in response to determining that one or more mandatory items of the completed number of items displayed in the user interface do not satisfy one or more operation requirements associated with the one or more mandatory items:

updating the displayed second number by subtracting the number of mandatory items that do not satisfy the one or more operation requirements from the displayed second number; and after updating the displayed second number, disabling the button in the user interface.

8. The non-transitory, computer-readable medium of claim 7, wherein displaying the first number and the second number in the user interface comprises displaying a counter showing the first number and the second number at a predetermined position in the user interface, and the button is a submission button.

9. The non-transitory, computer-readable medium of claim 7, wherein the first number is determined based on a third number representing a number of first-type items in the user interface, and the second number is determined based on a fourth number representing a number of second-type items in the user interface that are completed by the user.

10. The non-transitory, computer-readable medium of claim 7, wherein the operations further comprise activating the button in the user interface when the second number satisfies a predetermined condition.

11. The non-transitory, computer-readable medium of claim 7, wherein the first number and the second number are displayed on the button in the user interface.

12. The non-transitory, computer-readable medium of claim 7, wherein the attribute information of the button includes the transparency of the button, and the transparency of the button changes from a first transparency value to a second transparency value when the second number changes from a minimum value to a maximum value.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

displaying, by a display device, a form in a user interface with a number of items for a user to complete in the user interface;

determining a first number representing a total of the number of items;

receiving user input completing at least one of the number of items in the user interface;

in response to the received user input, determining a second number representing a number of completed items in the user interface;

displaying, in the user interface, both the first number and the second number on a button, wherein the displayed first number and the displayed second number are non-negative integers, the displayed first number is a fixed number, the displayed second number changes based on how many items of the number of items has been completed in the user interface, the button is disabled while the user is filling the form, and the button is enabled after the user has finished filling in the form with the displayed second number equal to the displayed first number;

obtaining an attribute information of the button, wherein the attribute information of the button corresponds to a display appearance of the button including at least one of transparency, hue, brightness, purity, size, and shape of the button;

changing a value of the attribute information based on the second number and a predetermined rule, wherein changing the value of the attribute information causes a change in the displayed appearance of the button;

when the button is enabled, in response to a user clicking input on the button, submitting the completed number of items displayed in the user interface for data verification;

in response to determining that one or more mandatory items of the completed number of items displayed in the user interface do not satisfy one or more operation requirements associated with the one or more mandatory items:

updating the displayed second number by subtracting the number of mandatory items that do not satisfy the one or more operation requirements from the displayed second number; and after updating the displayed second number, disabling the button in the user interface.

14. The computer-implemented system of claim 13, wherein displaying the first number and the second number in the user interface comprises displaying a counter showing the first number and the second number at a predetermined position in the user interface, and the button is a submission button.

15. The computer-implemented system of claim 13, wherein the first number is determined based on a third number representing a number of first-type items in the user interface, and the second number is determined based on a fourth number representing a number of second-type items in the user interface that are completed by the user.

16. The computer-implemented system of claim 13, wherein the operations further comprise activating the button in the user interface when the second number satisfies a predetermined condition.

* * * * *